United States Patent [19]

Borom et al.

[11] Patent Number: 5,011,049
[45] Date of Patent: Apr. 30, 1991

[54] MOLTEN METAL TRANSFER TUBE

[75] Inventors: Marcus P. Borom, Schenectady; Lawrence E. Szala, Scotia; Milivoj Brun, Ballston Lake; Steven A. Miller, Amsterdam, all of N.Y.; David P. Mourer, Danvers, Mass.

[73] Assignee: General Electric Company, Schenectady, N.Y.

[21] Appl. No.: 339,460

[22] Filed: Apr. 17, 1989

[51] Int. Cl.$^5$ .............................................. B22D 37/00
[52] U.S. Cl. .................................. 222/590; 222/607; 264/125
[58] Field of Search ..................... 264/30, 271.1, 279.1, 264/101, 125; 266/44, 45, 236; 222/606, 607, 590, 591

[56] References Cited

U.S. PATENT DOCUMENTS 1,022,011  4/1912  Weintraub ........................... 264/125
4,497,473  2/1985  Robyn et al. ......................... 266/44

FOREIGN PATENT DOCUMENTS 0158563  7/1987  Japan ................................. 222/606
0158564  7/1987  Japan ................................. 222/606

Primary Examiner—S. Kastler
Attorney, Agent, or Firm—Jane M. Binkowski; James C. Davis, Jr.; James Magee, Jr.

[57] ABSTRACT

A transfer tube is produced comprised of a high density ceramic oxide tube having directly bonded to its outer surface wall a low density ceramic oxide shell.

9 Claims, 2 Drawing Sheets

MOLTEN METAL TRANSFER TUBE

This invention relates to the production of a transfer tube comprised of a high density ceramic oxide tube having directly bonded to its outer surface wall a low density ceramic oxide covering.

In the past, because of their chemical inertness and resistance to thermal shock, low density tubes of alumina and zirconia have been used to transfer molten metal. One disadvantage of the low density tubes is that they are mechanically weak and fragments, which are very deleterious to the properties of the bulk metal, crack off and enter the passing stream of molten metal. Frequently, the low density tubes break up. Also, the low density tubes have rough surfaces which provide very high specific surface areas where oxides and slag can adhere and ultimately block the orifices. On the other hand, high density tubes are not useful because of their poor thermal shock resistance.

The present invention overcomes the disadvantages of the prior art by providing an integral transfer tube comprised of a high density ceramic oxide tube with its outer surface wall preferably enveloped by low density ceramic oxide material. The low density material has a thermal conductivity sufficiently lower than that of the high density tube to prevent build-up of thermal stresses therein that would have a significantly deleterious effect on the high density tube. Also, the high density tube in the present transfer tube provides a smooth, or substantially smooth, surface thereby eliminating or significantly reducing adherence of oxide or slag.

Those skilled in the art will gain a further and better understanding of the present invention from the detailed description set forth below, considered in conjunction with the figures accompanying and forming a part of the specification in which.

Briefly stated, the present transfer tube is comprised of a hollow high density tube having directly bonded only to its outer surface wall a single continuous low density shell, said high density tube and low density shell being comprised of polycrystalline ceramic oxide material, said high density tube having a density of at least about 90% of its theoretical density, said high density tube having a passageway extending through its length with a cross-sectional area at least sufficient for transfer of molten metal therethrough, said low density shell ranging in density from about 40% to about 80% of its theoretical density, said low density shell having a thermal conductivity at least about 10% lower than that of said high density tube, said low density shell having a thermal expansion coefficient within about ±25% of the thermal expansion coefficient of said high density tube.

The term "metal" herein includes metal alloys, particularly superalloys.

Figure 1:
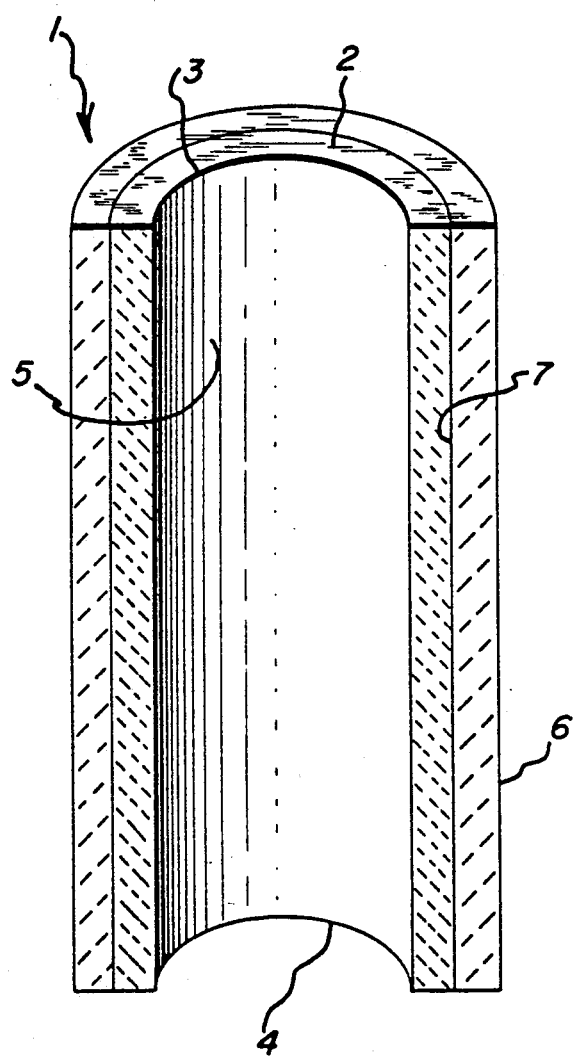
FIG. 1 illustrates a cross-sectional view of one embodiment of the present transfer tube.

FIG. 1 shows transfer tube 1 containing high density ceramic oxide tube 2 which is open at both its upper end portion 3, i.e. the entrance end for the molten metal, and its lower end portion 4, i.e. the exit end for the molten metal. Passageway 5 extends through tube 2, and in this embodiment, passageway 5 has the same circular cross-sectional area throughout its length. Low density ceramic oxide shell 6 is directly bonded to the outer surface wall 7 of high density tube 2.

Figure 2:
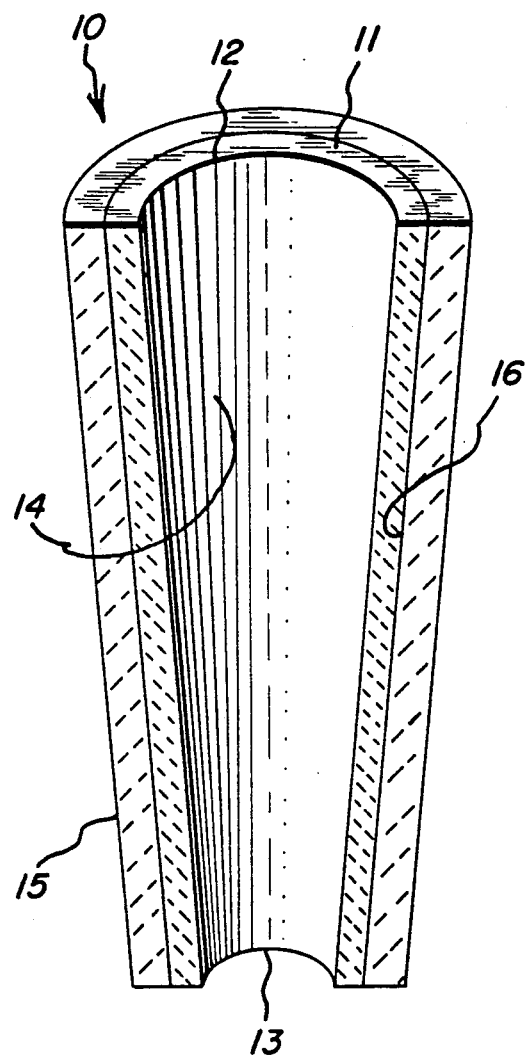
FIG. 2 shows a cross-sectional view of another embodiment of the present transfer tube.

FIG. 2 shows transfer tube 10 comprised of high density ceramic oxide tube 11 which is open at both its upper end portion 12 through which the molten metal enters the tube, and its lower end portion 13 through which the molten metal exits the tube. Passageway 14 extends through tube 11, and in this embodiment, passageway 14 decreases in circular cross-sectional area from upper end portion 12 to lower end portion 13. Low density ceramic oxide shell 15 is directly bonded to the outer surface wall 16 of high density tube 11.

In the present transfer tube, the high density tube is a hollow body with two open ends, i.e. an entrance end and an exit end. It has a passageway extending throughout its length, i.e. through both open ends. The cross-sectional area of the passageway is at least sufficient to permit the passage of a molten metal downwardly therethrough. The particular cross-sectional area of the passageway depends largely on the particular application of the transfer tube and is determined empirically. Generally, the cross-sectional area of the passageway ranges from about 0.8 to about 5000 square millimeters, frequently from about 3 to about 1500 square millimeters or from about 7 to about 1000 square millimeters. The cross-sectional area can be the same, or it can vary, through the length of the passageway.

The high density tube, as well as the passageway extending therethrough, can be in any desired shape. For example, the cross-sectional area of the passageway can be in the shape of a circle, a square, an oval, a rectangle, a star, and any combination thereof. The outer wall of the high density tube can be flat but preferably it is curved. For example, the high density tube can be in the form of a cylinder, rectangle, or a square. Preferably, the high density tube, including its passageway, is cylindrical in shape.

The high density tube has a minimum wall thickness which depends largely on the application of the transfer tube and is determined empirically. Generally, the high density tube has at least a wall thickness which is sufficient to maintain, or substantially maintain, its integrity in the transfer tube when molten metal is passed therethrough. Generally, the wall thickness of the high density tube ranges from about 0.125 millimeters to less than about 6.5 millimeters, frequently from about 0.250 millimeters to about 2 millimeters, or from about 0.700 millimeters to about 1.500 millimeters. Generally, a high density tube with a wall thickness greater than about 6.5 millimeters provides no advantage.

The high density tube has a length which can vary widely depending largely on the application of the transfer tube and is determined empirically. It has a length at least sufficient for transfer of molten metal therethrough. It can be as long as desired. Generally, its length ranges from about 15 millimeters to about 1000 millimeters, and frequently, it ranges from about 25 millimeters to about 200 millimeters. For example, when the transfer tube is used as an orifice, its length generally ranges from about 25 millimeters to about 100 millimeters.

Generally, the high density tube ranges in density from about 90% to about 100%, preferably from about 95% to about 100%, of its theoretical density. The particular density depends largely on the particular application of the transfer tube and is determined empirically. Preferably, porosity in the high density tube is non-interconnecting.

The average grain size of the high density tube may vary depending largely on the particular application of the transfer tube and is determined empirically. Preferably, the average grain size of the high density tube is sufficiently small to prevent cracking off, or significant cracking off, of fragments of the tube when contacted by passing molten metal at the particular temperatures used. Generally, the average grain size of the high density tube ranges from about 5 microns to about 50 microns, or from about 10 microns to about 40 microns, or from about 20 microns to about 30 microns.

The chemical composition of the high density ceramic oxide tube depends largely on the particular application of the transfer tube and is determined empirically. The high density tube is comprised of polycrystalline ceramic oxide material which is chemically inert, or substantially chemically inert, with respect to the molten material to be passed therethrough. Specifically, it should have no significant deleterious effect on the molten metal passed therethrough.

Preferably, the high density tube is comprised of a ceramic oxide material selected from the group consisting of alumina, beryllia, magnesia, magnesium aluminate, mullite, yttria, zirconia, and mixtures thereof. Generally, the zirconia is known in the art as stabilized zirconia which generally is comprised of the cubic structure, or a combination of cubic, monoclinic and tetragonal structures.

The high density tube may be available commercially. It also can be produced by a number of conventional techniques known in the ceramics art. In a preferred technique, sinterable ceramic oxide particulate material is shaped into the desired form of hollow tube having dimensions which on densification will produce the desired high density tube and is sintered in a gaseous atmosphere or a partial vacuum at a temperature at which it will densify to the desired density. Particulate size of the sinterable material is determinable empirically and depends largely on the grain size desired in the high density tube. Generally, the sinterable material has an average particle size of less than 5 microns. Also, the sinterable particulate material can vary widely in composition depending largely on the particular high density tube desired. For example, it may be comprised of ceramic oxide powder alone, or of a mixture of the ceramic oxide powder and a sufficient amount of a sintering agent therefor determined empirically. The sinterable zirconia material would include a stabilizing agent therefor in an effective amount as is well-known in the art to produce generally the cubic structure, or a combination of cubic, monoclinic and tetragonal structures. In a specific example, alumina powder having a average particle size of about 4 microns can be shaped into a tube and sintered in argon at about atmospheric pressure at about 1700° C. to produce the present high density tube.

The high density tube has a thermal expansion coefficient which depends largely on the particular transfer tube desired and its application and is determined empirically. Generally, the high density tube has a thermal expansion coefficient greater than about $40 \times 10^{-7}/°C.$, frequently greater than about $65 \times 10^{-7}/°C.$, and more frequently it is about $90 \times 10^{-7}/°C.$ In the present transfer tube, the high density tube is surrounded by the low density shell. Generally, the low density shell has a thermal expansion coefficient which is within ±25%, preferably within ±10%, or within ±5%, of that of the high density tube. Most preferably, the low density shell has a thermal expansion coefficient which is the same as, or not significantly different from, that of the high density tube.

The low density shell has a thermal conductivity which is always significantly lower than that of the high density tube and which depends largely on the application of the resulting transfer tube. The shell has a thermal conductivity, determined empirically, which is sufficiently low to prevent formation of a significantly deleterious high thermal gradient through the wall of the high density tube. Generally, the present shell prevents cracking off, or significant cracking off, of fragments of the high density tube into the passing molten metal. The shell, through its low thermal conductivity and direct bonding to the high density tube, physically reduces the thermal gradients through the wall of the high density tube sufficiently for the present transfer tube to be useful for transfer of molten metal. The direct bonding of the shell to the high density tube facilitates constraint of the high density tube and transfer of beneficial, biaxial compressive stresses to the high density tube. Thermal gradients which would be significantly deleterious to the high density tube have no significant deleterious effect on the low density shell because of its lower elastic modulus and higher toughness. Generally, the thermal conductivity of the shell ranges from about 10% to about 90% lower, or from about 20% to about 50% lower, than that of the high density tube.

The low density shell has a density which depends largely on the particular application of the transfer tube and is determined empirically. Generally, for a low density shell of given chemical composition, the larger its volume of pores, the lower is its thermal conductivity. Generally, the low density shell has a density ranging from about 40% to about 80%, frequently from about 50% to about 70%, or from about 60% to about 65%, of its theoretical density. Porosity in the low density shell is interconnecting.

The grain size of the low density shell may vary depending largely on the porosity desired therein. It may be of a distributed size generally ranging from about 5 microns to about 100 microns or from about 10 microns to about 90 microns. Generally, its average grain size ranges from about 10 microns to about 80 microns, or from about 10 microns to about 70 microns.

The low density shell can vary widely in shape. It has a minimum wall thickness which depends largely on the particular application of the transfer tube and is determined empirically. Its minimum wall thickness should be sufficient to prevent deleterious effect, or significant deleterious effect, of the high density tube when molten metal is passed therethrough. Generally, the minimum wall thickness of the shell is about 1 millimeter. The maximum wall thickness of the low density shell can be as large as desired. Generally, the wall thickness of the low density shell ranges from about 1 millimeter to about 100 millimeters, or from about 2 millimeters to about 50 millimeters, or from about 3 millimeters to about 10 millimeters.

The low density shell is an integral body. Generally, it covers the outer surface wall of the high density tube leaving no significant portion thereof exposed. For example, if desired, an end portion or both end portions of the high density tube may be left exposed in the resulting transfer tube if necessary to fit it into a particular device. Preferably, the low density shell leaves none, or substantially none, of the outer surface wall of the high density tube exposed.

The low density shell is comprised of ceramic oxide material whose composition can vary depending largely on the particular application of the transfer tube and is determined empirically.

Preferably, the low density shell is comprised of ceramic oxide material selected from the group consisting of alumina, berrylia, magnesia, magnesium aluminate, mullite, yttria, zirconia and mixtures thereof. The zirconia is stabilized zirconia generally comprised of the cubic structure, or a combination of the cubic, monoclinic and tetragonal structures.

The present process for producing a transfer tube comprised of a high density tube having directly bonded to its outer surface wall leaving no significant portion thereof exposed a continuous polycrystalline shell with a maximum density of about 80% of theoretical comprises providing a high density polycrystalline hollow tube comprised of ceramic oxide material, said high density tube having a density of at least about 90% of its theoretical density, providing particulate ceramic oxide material which sinters to form said shell, providing a mold having a closed end portion and an open end portion and an inner wall sufficient to enable formation of said transfer tube, disposing said high density tube in said mold with its entire outer surface wall spaced from the inner wall of said mold thereby forming a space for receiving said shell-forming particulate material, depositing said shell-forming particulate material in said mold in said space between said high density tube and inner wall of said mold to form a body of freely deposited particulate material, said shell-forming particulate material being deposited in an amount sufficient to form said shell, heating the resulting assembly to a temperature at which said shell-forming material sinters to produce said transfer tube, said sintering being carried out in an atmosphere or a partial vacuum which has no significant deleterious effect on said assembly, said mold having no significant deleterious effect on said transfer tube.

The sinterable ceramic oxide particulate material used to form the shell, i.e. the shell-forming powder, can range in particle size but should be of a size or size distribution, determined empirically, which will produce the desired sintered shell. In one embodiment, the shell-forming powder is comprised of coarse particles generally ranging in size from about 15 microns to about 40 microns. In another embodiment, the shell-forming powder is comprised of particles of distributed size, usually mixtures of fine and coarse powders, generally ranging from about one micron to about 100 microns. Fine powder alone, i.e. powder having a size of less than about 10 microns, is not useful for producing the low density shell.

The shell-forming powder can vary widely in composition depending largely on the particular low density shell desired. It should be of a composition which produces the desired shell directly bonded to the outer surface wall of the high density tube. For example, it may be comprised of ceramic oxide powder alone, or of a mixture of the ceramic oxide powder and a sufficient amount of a sintering agent therefor determined empirically. The sinterable zirconia particulate material would include a stabilizing agent therefor as is well-known in the art.

In carrying out the present process, a mold is provided which is of a size and shape that will accommodate the production of the transfer tube, i.e. the high density tube and the amount of shell-forming powder required to produce the desired shell. Generally, the mold has two opposed end portions, a closed end portion and an open end portion. Frequently, the mold is in the form of a hollow cylinder closed at one end and open at the opposite end. The length of the mold wall should be at least sufficient to enable the formation of the desired shell.

In the present process, the mold has no deleterious effect, or no significant deleterious effect, on the production of the transfer tube or on the transfer tube. At least the molding surface, and preferably the entire mold, is substantially chemically inert with respect to the components used to form the transfer tube. The molding surface should not adhere to the components used to form the transfer tube. Preferably, the molding surface is comprised of boron nitride, and more preferably, the entire mold is comprised of boron nitride.

Figure 3:
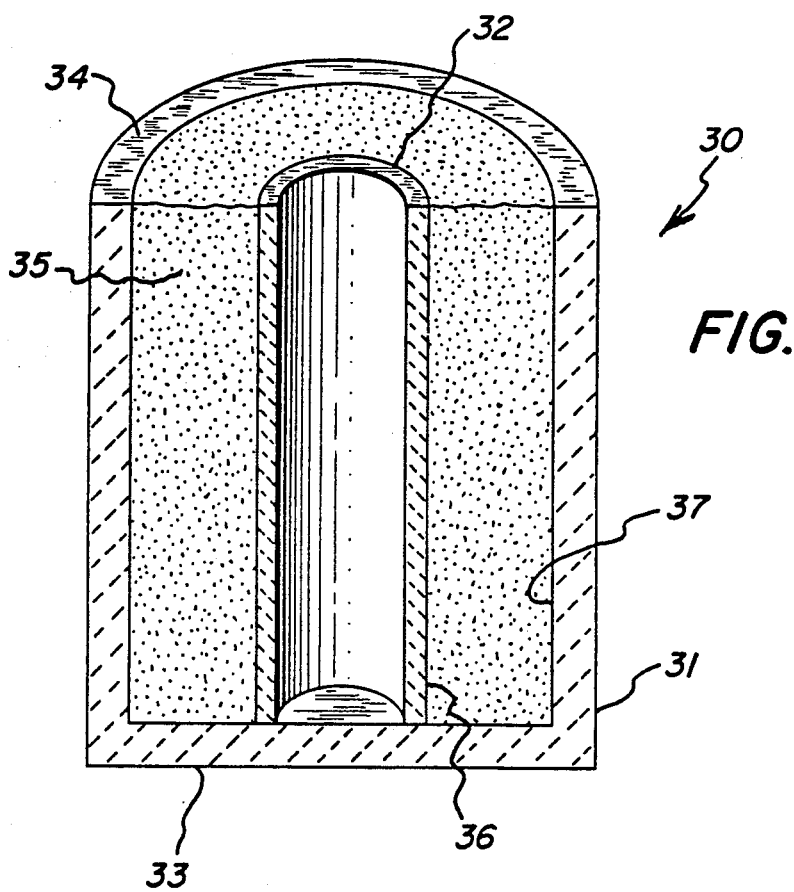
FIG. 3 shows the cross-section of one embodiment of an assembly useful for carrying out the processing required to produce the present transfer tube.

FIG. 3 illustrates a preferred assembly 30 useful for producing the present transfer tube. High density tube 32 is centrally disposed within mold 31 which is closed at its bottom end portion 33 and open at its upper end portion 34. Shell-forming powder 35 is disposed in the space between outer surface wall 36 of tube 32 and molding wall 37 of mold 31.

Solid boron nitride tubing is commercially available and can be used to construct a mold similar to that shown in FIG. 3. For example, the commercially available boron nitride tube can be hollowed out by machining in a conventional manner and provided with a slab of boron nitride to form the bottom portion 33. However, commercially available boron nitride pieces frequently contain boron oxide and may contain other materials which would stick to the shell-forming powder during sintering and prevent production of the transfer tube. Therefore, before use, commercially available boron nitride pieces preferably are baked to remove material therefrom sufficiently which would cause sticking to the molding surface. Generally, baking of the boron nitride pieces in a partial vacuum of about 0.2 torr at a temperature of about 1900° C. for about one hour is sufficient to produce the desired non-sticking molding surfaces.

Generally, in carrying out the present process, the high density tube is substantially centrally disposed within the mold in a manner which would enable formation of the shell on its outer surface wall substantially uniformly.

The shell-forming powder is deposited in the space between the outer surface wall of the high density tube and the inner wall of the mold to produce a freely deposited body of powder which shrinks away from the inner surface of the mold without restriction during sintering. The shell-forming powder is gently loaded into its space in the mold to surround the high density tube and be in direct contact with the outer wall of the high density tube and with the inner wall of the mold. Generally, the shell-forming powder fills, or substantially fills, such space. No compressional force should be applied to the powder. Should a compressional force be applied to the powder in the mold and then removed, some of the compressed powder will spring back, but some will remain physically bonded together, thereby creating fissures in the body of powder which on sintering will produce a sintered body with deleterious cracks, or which is in the form of islands. In contrast, the present shell is an integral body free of cracks, or free of deleterious cracks, i.e. cracks which expose the outer surface wall of the high density tube. Therefore, in the present process, the shell-forming powder is loaded into the mold so that the resulting body of powder in the mold is free of fissures which would prevent the production of the present continuous shell.

The resulting assembly, an example of which is assembly 30, can be placed in a conventional sintering furnace, such as a molybdenum furnace, where the shell-forming powder is sintered to produce the present transfer tube. Sintering is carried out in an atmosphere which has no significant deleterious effect on the process or the resulting transfer tube. Preferably, the sintering atmosphere is non-oxidizing with respect to boron nitride. Representative of a useful gaseous atmosphere is a noble gas such as argon. Generally, the gaseous atmosphere is at about or below atmospheric pressure. Generally, the vacuum ranges from below atmospheric pressure to about 0.1 torr.

Sintering is carried out at a temperature and for a period of time, determined empirically, which will densify, i.e. sinter, the shell-forming powder to produce a shell of desired low density. Generally, the sintering temperature ranges from about 1000° C. to about 1900° C., frequently from about 1600° C. to about 1850° C., with the particular sintering temperature depending largely on the particular material being sintered. Generally, sintering is completed in less than one hour. Generally, the shell-forming powder sinters substantially anisotropically, i.e. generally it undergoes significant radial shrinkage but no significant longitudinal shrinkage.

The resulting sintered structure, i.e. transfer tube, is cooled at a rate which has no significant deleterious effect thereon, i.e. cooling should be carried out at a rate which prevents cracking of the transfer tube. The transfer tube may be furnace cooled. Generally, it is cooled in the same atmosphere or vacuum in which sintering was carried out. Generally, it is cooled to about room temperature, i.e. from about 20° C. to about 30° C.

Figure 4:
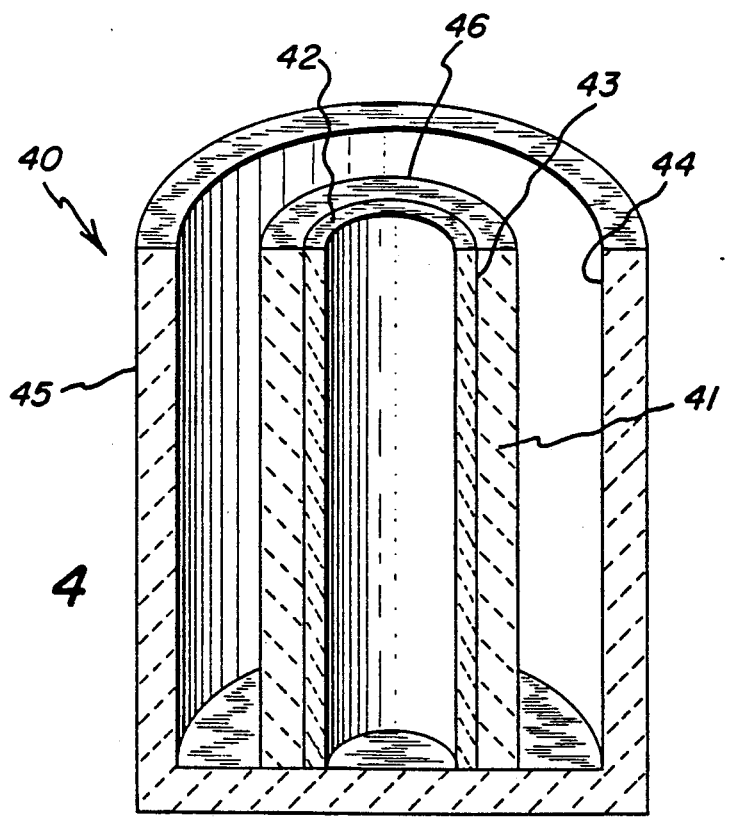
FIG. 4 shows the assembly of FIG. 3 after sintering has been carried out to produce the present transfer tube.

In FIG. 4, assembly 40 illustrates the assembly of FIG. 3 after sintering has been carried out. FIG. 4 shows low density sintered shell 41 directly bonded to outer surface wall 43 of high density tube 42 thereby comprising the present transfer tube 46. FIG. 4 also illustrates that no bonding or sticking has occurred between molding wall 44 of mold 45 and shell 41.

The present transfer tube is an integral body useful for transfer of molten metal, particularly alloys or superalloys. The present transfer tube is particularly useful for transfer of molten metal, alloy or superalloy at a temperature ranging from about 500° C. to less than 1900° C., or from above 1000° C. to less than 1900° C., of from about 1100° C. to about 1800° C., or from about 1300° C. to about 1600° C. Generally, the transfer tube is preheated to a temperature within about 300° C. of that of the molten metal to be passed therethrough. Otherwise, cracking may occur in the high density tube component of the transfer tube. Preheating of the transfer tube can be carried out in a conventional manner such as by means of an external resistance heater or an induction heater.

The present transfer tube has no significant deleterious effect on molten metal, metal alloys or superalloys passed therethrough. It is chemically inert, or substantially chemically inert, with respect to molten metal, metal alloy or superalloy passed therethrough.

Generally, the transfer tube is dimensionally stable, or substantially dimensionally stable, at the temperature of use. Preferably, the low density shell does not shrink, or does not shrink to any significant extent, at the temperature of use of the transfer tube.

The present invention permits the direct production of a transfer tube useful for transfer of molten metal. However, if desired, the transfer tube may be machined in a conventional manner to meet required specifications.

The present transfer tube is particularly useful in the steel industry for the casting of ingots.

The invention is further illustrated by the following examples wherein the procedure was as follows unless otherwise stated:

A resistance furnace with molybdenum heaters was used.

Sintering and cooling were carried out in helium at about atmospheric pressure.

The sintered transfer tube was furnace-cooled to about room temperature, i.e. from about 20° C. to about 30° C.

Standard techniques were used to characterize the transfer tube.

EXAMPLE 1

A commercially available high density hollow cylindrical tube of polycrystalline alumina was used. The tube had a density of about 99% of theoretical density and an average grain size of about 20 microns. The tube was cylindrical with a cylindrical passageway of the same cross-sectional area extending therethrough. The tube had an inner diameter of about 5 millimeters, a wall thickness of about 1 millimeter, and a length of about 54 millimeters.

The shell-forming powder was comprised of abrasive grade alumina particles having an average size of about 25 microns.

A mold of boron nitride was constructed. Specifically, a commercially available solid boron nitride rod having a diameter of about 22 millimeters was hollowed out by machining in a conventional manner to produce a hollow tube having a cylindrical passageway of substantially the same cross-sectional area extending therethrough. The hollowed boron nitride tube had a wall thickness of about 3 millimeters and a length of about 38 millimeters. Another piece of commercially available solid boron nitride rod was machined to form a substantially flat piece with a flanged periphery which was fitted into one end portion of the hollowed tube to form a mold with one closed end portion and one open end portion.

This mold was heated in a vacuum of about 0.1 torr at 1900° C. for one hour and then furnace cooled to room temperature. The mold sustained a weight loss of 6%. This heat treatment was designed to eliminate from the boron nitride any $B_2O_3$ which might cause adhesion of the alumina particles to the wall of the mold.

The high density tube was then substantially centrally disposed in the boron nitride mold. About 25 grams of the shell-forming alumina powder was gently shaken into the space between the outer wall of the high density alumina tube and the inner wall of the mold to fill the space. The alumina powder in the mold was a freely deposited body of powder in direct contact with the outer surface wall of the high density alumina tube and the inner surface of the mold.

The resulting assembly was placed upright in the furnace, i.e. with the open end portion of the mold exposed to the furnace atmosphere and heated at 30° C. per minute to a 10 minute isothermal hold at 1800° C. and then furnace cooled to room temperature.

Examination of the assembly showed that the alumina did not stick to the inner surface of the mold.

The resulting transfer tube was comprised of the high density tube with a low density shell directly bonded to its outer surface wall leaving none of the outer surface wall exposed. The shell was totally crack free. It appeared that the alumina powder had undergone approximately 10% radial shrinkage and essentially no longitudinal shrinkage. Decoupling of the freely deposited alumina powder from the boron nitride surface had allowed the powder to undergo substantially anisotropic shrinkage without cracking. The shell appeared to have an average grain size of about 25 microns.

The transfer tube was cut to produce a cross section thereof about 1 centimeter long which was used to determine the density of the shell which was 59.9%. The porosity in the shell was interconnecting.

EXAMPLE 2

The procedure and materials used in this example for producing a transfer tube were the same as set forth in Example 1.

The resulting transfer tube appeared to be identical to that produced in Example 1.

The transfer tube was then placed in a boron nitride support sleeve and molten René 95, which was at 1600° C., was passed through it for about 3 minutes. The liquid metal was caught in a crucible where it solidified into an ingot.

Examination of the transfer tube showed that cracking had occurred in the high density tube component but the part remained intact.

EXAMPLE 3

The procedure and materials used in this example for producing a transfer tube were the same as set forth in Example 1.

The resulting transfer tube appeared to be identical to that produced in Example 1.

The transfer tube was then placed in a boron nitride support sleeve and a molybdenum wire wound oven was placed around it to heat it to a temperature within 300° C. of 1600° C.

Molten René 95, which was at 1600° C., was passed through the heated tube for about 3 minutes. The liquid metal was caught in a crucible where it solidified into an ingot.

Examination of the transfer tube showed that the molten metal had no deleterious effect on it. No cracks were visible in the high density tube component.

What is claimed is:

1. A process for producing a transfer tube useful for transfer of molten metal comprised of a high density hollow tube having directly bonded to its outer surface wall a continuous polycrystalline shell with a maximum density of about 80% of theoretical which comprises providing a high density polycrystalline hollow tube comprised of ceramic oxide material, said high density tube having a density of at least about 90% of its theoretical density, providing particulate ceramic oxide material which sinters to form said shell, providing a mold having a closed end portion and an open end portion and an inner wall sufficient to enable formation of said transfer tube, disposing said high density tube in said mold with its outer surface wall spaced from said inner wall of said mold thereby forming a space for receiving said shell-forming particulate material, depositing said shell-forming particulate material in said space between said high density tube and inner wall of said mold to form a body of freely deposited particulate material, said shell-forming particulate material being deposited in an amount sufficient to form said shell, heating the resulting assembly to a temperature at which said shell-forming material sinters to produce said transfer tube, said sintering being carried out in an atmosphere or a partial vacuum which has no significant deleterious effect on said assembly, said mold having no significant deleterious effect on said transfer tube.

2. The process according to claim 1, wherein said high density tube is comprised of ceramic oxide material selected from the group consisting of alumina, beryllia, magnesia, magnesium aluminate, mullite, yttria, zirconia, and mixtures thereof.

3. The process according to claim 1, wherein said shell is comprised of ceramic oxide material selected from the group consisting of alumina, beryllia, magnesia, magnesium aluminate, mullite, yttria, zirconia, and mixtures thereof.

4. The process according to claim 1, wherein said shell has a density ranging from about 40% to about 80% of its theoretical density.

5. The process according to claim 1, wherein said high density tube has a density ranging from about 90% to about 100% of its theoretical density.

6. The process according to claim 1, wherein said transfer tube is comprised of alumina.

7. The process according to claim 1, wherein said mold is comprised of boron nitride.

8. The process according to claim 1, wherein said sintering temperature ranges from about 1000° C. to about 1900° C.

9. A process for producing a transfer tube useful for transfer of molten metal comprised of a high density hollow tube having directly bonded to its outer surface wall a continuous polycrystalline shell with a maximum density of about 80% of theoretical which comprises providing a high density polycrystalline hollow tube comprised of alumina, said high density tube having a density of at least about 90% of its theoretical density, providing particulate alumina material which sinters to form said shell, providing a mold having a closed end portion and an open end portion and an inner wall sufficient to enable formation of said transfer tube, disposing said high density tube in said mold with its outer surface wall spaced form said inner wall of said mold thereby forming a space for receiving said shell-forming particulate material, depositing said shell-forming particulate material in said space between said high density tube and inner wall of said mold to form a body of freely deposited particulate material, said shell-forming particulate material being deposited in an amount sufficient to form said shell, heating the resulting assembly to a temperature at which said shell-forming material sinters to produce said transfer tube, said sintering being carried out in an atmosphere or a partial vacuum which has no significant deleterious effect on said assembly, said mold having no significant deleterious effect on said transfer tube.

* * * * *